J. C. O'ROAKE.
SEED CORN STRINGER.
APPLICATION FILED JAN. 18, 1910.
1,034,287.
Patented July 30, 1912.
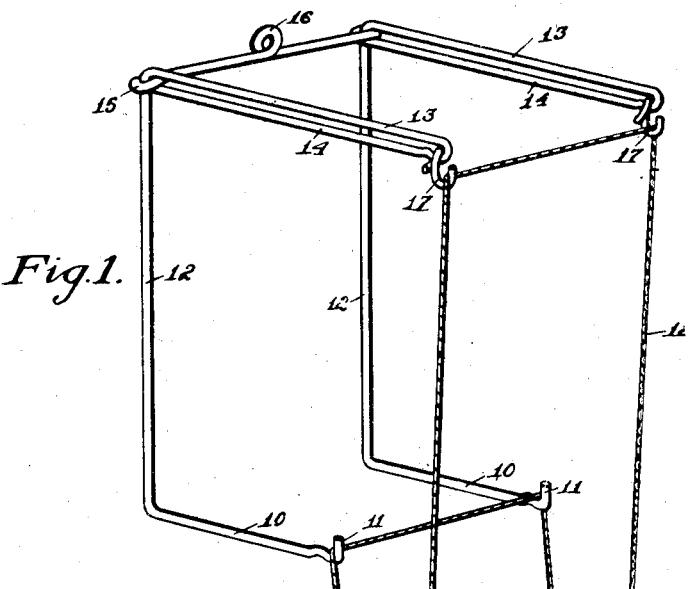
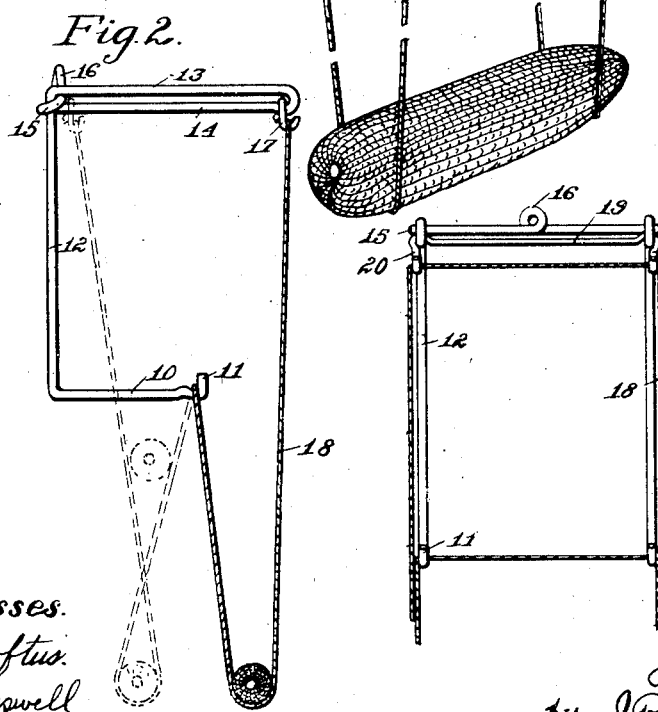
Witnesses.
W. A. Loftus.
F. C. Caswell.
Inventor.
J. C. O'Roake.
by J. Ralph Emry atty.

UNITED STATES PATENT OFFICE.

JAMES C. O'ROAKE, OF NEWTON, IOWA.

SEED-CORN STRINGER.

1,034,287.

Specification of Letters Patent.  Patented July 30, 1912.

Application filed January 18, 1910. Serial No. 538,791.

*To all whom it may concern:*

Be it known that I, JAMES C. O'ROAKE, a citizen of the United States, residing at Newton, in the county of Jasper and State of Iowa, have invented a certain new and useful Seed-Corn Stringer, of which the following is a specification.

The object of my invention is to provide a seed corn rack of simple and inexpensive construction by means of which any desired number of ears of corn or other articles may be readily, quickly and easily supported in such a manner that none of the articles will touch each other at any point and each will be exposed to the air throughout its entire surface and all of said ears of corn will be firmly and securely held in such a manner that they may be easily handled and moved from place to place without changing the relative positions of any of them.

My invention consists in the construction, arrangement and combination of the various parts of the device whereby the objects contemplated are attained, as hereinafter more fully set forth, pointed out in my claims and illustrated in the accompanying drawings, in which:

Figure 1 shows a perspective view of the complete device embodying my invention with an ear of corn supported therein. Fig. 2 shows a side elevation of same showing an ear of corn supported therein, and also showing by dotted lines the position of the various parts ready to receive a second ear of corn, the position of said second ear being indicated by dotted lines, and Fig. 3 shows a front elevation of a device embodying my invention illustrating a slight modification.

Referring to the accompanying drawings, it will be seen that the device comprises a frame made of a single piece of wire which has its end portions extended horizontally at 10 to form supporting arms which are provided at their ends with the upwardly extending hooks 11. At the inner ends of the parts 10 are two upwardly extending portions 12 designed to rest against a wall or other support on which the frame is placed. At their upper ends are the forwardly projecting portions 13 and below these portions 13 are the rearwardly extending portions 14. The said parts 13 and 14 form a guide between them for the adjustable twine supporting hooks hereinafter described. At the rear of each of the parts 14 is a loop 15 and the central portion of the wire extends transversely and is provided at its center with a loop 16 by which the frame may be supported from a nail or the like. Slidingly mounted between the parts 13 and 14 on each side is a hook 17 capable of free movement from the front to the rear of said parts 13 and 14.

In connection with the device, I have provided a single piece of twine 18 with its ends connected, said twine being supported upon the hooks 17 and also upon the hooks 11 as shown, the central portion of the twine being permitted to hang downwardly below the frame.

In the modified form illustrated in Fig. 3, I have substituted for the hooks 17 a single piece of wire 19 having the hooks 20 formed on its ends to receive the twine. In some instances it is more convenient to grasp the wire 19 at its central portion and move it forwardly and rearwardly, than it is to jointly move the two hooks 17.

In practical use and assuming that the frame is connected with a suitable support in an elevated position, then the operator takes a piece of twine and unites the ends thereof and connects it with the hooks 17 and 11 as shown. He then places an ear of corn in the twine as it hangs below the frame in the manner illustrated in Fig. 1. He then moves the hooks 17 rearwardly thus causing the side portions of the twine to cross each other as shown by dotted lines in Fig. 2. He then places a second ear of corn between the sides of the twine as illustrated in Fig. 2 by dotted lines. He then moves the hooks 17 forwardly and a third ear is placed therein above the crossed side portions of the twine. In this manner it is obvious that all of the ears of corn will be held spaced apart from each other and the air may freely circulate all around each ear. This operation of moving the hooks 17 forwardly and rearwardly is carried on each time that an ear of corn is placed in the twine. In the event that it is desired to use more than one twine and assuming that the first piece of twine placed on the frame is full then the operator grasps the portions of the twine between the hooks 11 and between the hooks 12 and thus removes the entire twine together with the ears of corn supported thereby and the twine may then be placed on a stationary support such, for instance, as a nail and another twine may be substituted on the frame and filled in a manner before described so that, if it is desired to put away a large number of ears of seed corn, the operator need only have one of the frames and then may use any desired number of pieces of twine or the like, one of which after being filled may remain on the frame as a permanent support for it.

In seed corn it is essential that all of the ears of corn remain in their respective positions so that when grains of corn are removed from the ears for testing purposes the operator may readily and easily identify the particular ear from which the seeds for testing have been taken.

Obviously by my improvement, the operator may remove grains of corn for testing purposes from the various ears supported in the twine beginning at the bottom and may place said grains of corn in a testing apparatus in consecutive order. Then he may readily ascertain the particular ear from which any of the grains of corn have been taken by counting the ears of corn beginning at the bottom in the same order in which the grains of corn are removed from said ears as it is impossible for the ears to be changed in respect to their arrangement within the twine.

It is obvious that the rack may be used for purposes other than seed corn and I have found it to be very desirable for use in displaying articles in show windows and the like and I do not desire to be understood as limiting myself to the use of the device for seed corn purposes only.

I claim as my invention:

1. A device of the class described, comprising a frame having two outwardly extended arms at its lower end, each being provided with a hook, and two outwardly extended arms at its upper end, the latter extending outwardly beyond the lower ones, two hooks slidingly mounted upon the upper arms being capable of movement forwardly and rearwardly beyond the stationary hooks; said hooks being designed to receive a twine, for the purposes stated.

2. A device of the class described, comprising a frame having two outwardly extended arms at its lower end, each being provided with a hook and two outwardly extended arms at its upper end, the latter extending outwardly beyond the lower ones, two hooks slidingly mounted upon the upper arms being capable of movement forwardly and rearwardly beyond the stationary hooks, and a cross piece connecting said hooks for moving them in unison.

3. A device of the class described, comprising a frame formed complete of a single piece of wire and having its end portions in parallel positions spaced apart, hooks at the ends thereof extended upwardly, two upwardly extending portions to rest against a support, two outwardly extending portions above the said hooks, two rearwardly extended portions below and parallel with the said outwardly extended portions, two loops formed on the inner ends of the rearwardly extended portions and passed around said upwardly extended portions, the part of the wire between said loops being extended transversely and also being provided with a central loop to receive a nail or other support, two hooks slidingly mounted between said outwardly and rearwardly extending portions at the top of the frame, being capable of movement forwardly and rearwardly beyond the stationary hooks, said hooks being designed to receive a twine, for the purposes stated.

Des Moines, Iowa, Jan. 6, 1910.

JAMES C. O'ROAKE.

Witnesses:
M. B. GOLDIZEN,
M. WALLACE.